United States Patent [19]

Cote et al.

[11] Patent Number: 4,971,380

[45] Date of Patent: Nov. 20, 1990

[54] VEHICLE BACKREST ATTACHING ARRANGEMENT

[75] Inventors: Janice E. Cote, Ann Arbor; William M. Safran, Farmington Hills, both of Mich.

[73] Assignee: Chrysler Corporation, Highland Park, Mich.

[21] Appl. No.: 484,294

[22] Filed: Feb. 26, 1990

[51] Int. Cl.[5] ............................................... B60N 2/00
[52] U.S. Cl. ...................................... 296/63; 297/444; 248/301
[58] Field of Search ...................... 296/63, 64; 297/14, 297/444; 248/201, 301, 503.1

[56] References Cited

U.S. PATENT DOCUMENTS

| 309,750 | 12/1884 | Van Campen | 297/444 |
| 338,537 | 3/1886 | Mankel | 297/444 |
| 4,365,840 | 12/1982 | Kehl et al. | 297/444 X |
| 4,771,507 | 9/1988 | Draplin et al. | 297/334 X |

Primary Examiner—Margaret A. Focarino
Assistant Examiner—Gary C. Hoge
Attorney, Agent, or Firm—Edward P. Barthel

[57] ABSTRACT

An improved attachment arrangement for a backrest assembly in combination with an auxiliary folding seat cushion having a pair of hinge assemblies mounting the seat cushion on a vertical wall of a vehicle. The backrest assembly comprises a base panel supporting a coextensive foam pad enclosed by an outer upholstery cover. The base panel for single passenger setting requires a pair of pre-attached hangers spaced along its upper edge and a pair of pre-attached spring clips spaced along its lower portion. The lower spring clips are adapted for ready connection to wall mounted hinges of the folding seat cushion while the upper hangers provide ready initial pre-positioning of the backrest assembly to the vehicle wall. A single screw hole in each hanger is self-aligned with a vehicle wall installation hole allowing subsequent ready piloting and driving of the hanger screws.

3 Claims, 3 Drawing Sheets

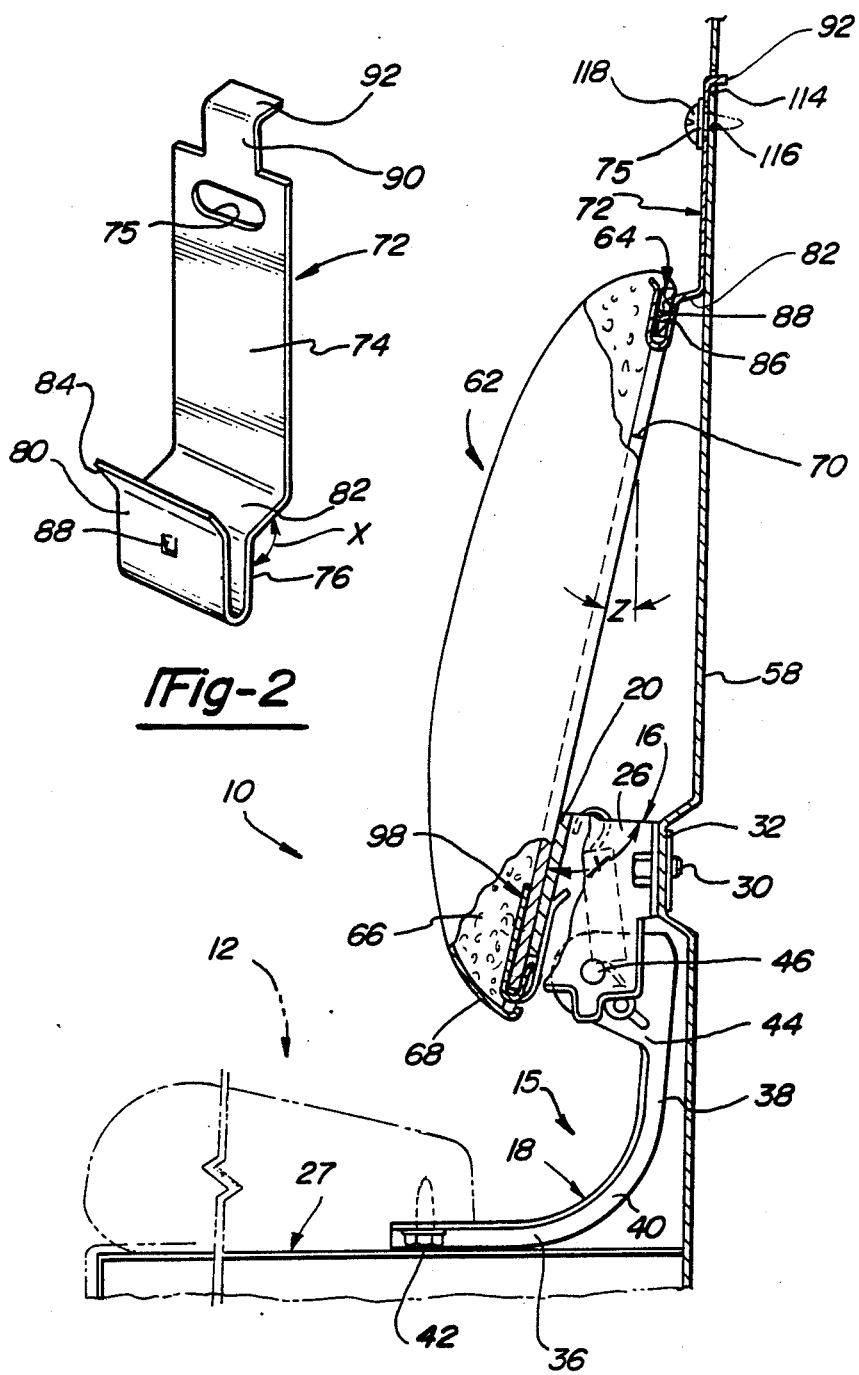

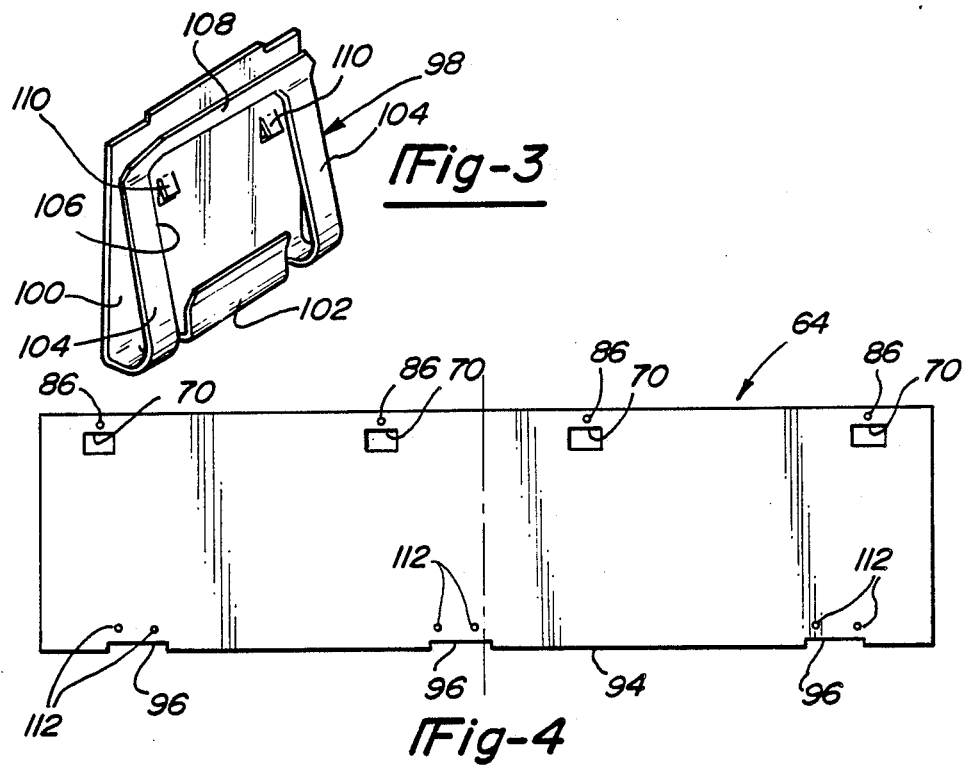
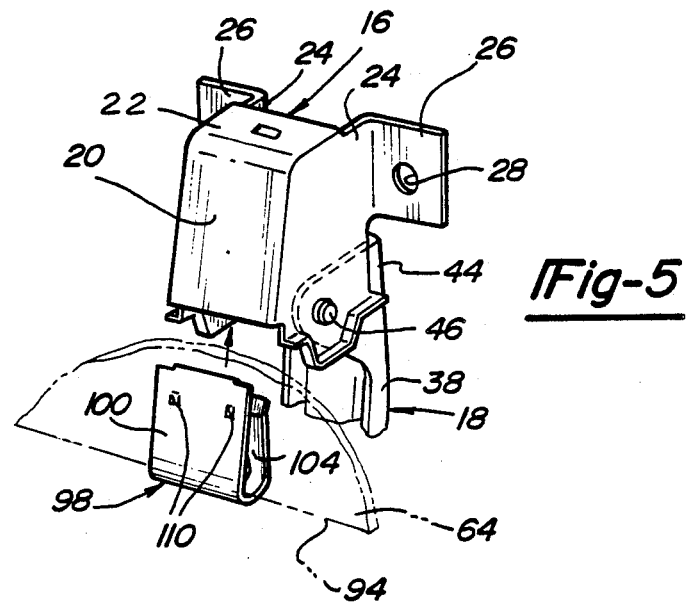

VEHICLE BACKREST ATTACHING ARRANGEMENT

Introduction

This invention relates to automotive vehicle seats, and more particularly, to backrest assembly attaching arrangement for vehicle seating such as an auxiliary rear seat.

Background Of The Invention

The U.S. Pat. No. 4,771,507 issued Sep. 20, 1988 to Draplin et al. discloses a hinge assembly for use in mounting one or more auxiliary seat cushions on a vehicle such as a pickup truck extended cab. Each seat cushion is supported by a pair of horizontally spaced hinge mounting assemblies with each hinge assembly comprising an upper body-half bracket hinge member and a lower seat-half hinge member. The upper body-half bracket hinge member has a generally box-shaped channel configuration formed as a one-piece stamped sheet metal member. The truck cab rear wall has secured thereto a plurality of body-half bracket hinge members designed to support a backrest. The backrest has a base structure in the form of backing panel or "hardboard" with its lower portion supported at a desired comfort angle on the forwardly and downwardly sloped bight walls of two or more body-half bracket hinge members.

Brief Description Of The Invention

It is an object of the present invention to provide an improved vehicle backrest assembly requiring minimal installation time, labor and parts for attachment to a vehicle wall during assembly line production.

It is a further object of the present invention to provide an improved attachment arrangement for a vehicle backrest assembly as set forth above wherein a minimum number of threaded fasteners are required to secure the seatback assembly on the vehicle wall.

It is still another object of the present invention to provide an improved attachment arrangement for a vehicle backrest assembly as set forth above wherein a backrest assembly for single passenger seating requires only two pre-attached spring clips on the lower portion of the seatback assembly backing panel and two hanger members pre-attached on the upper portion of the backing panel whereby the backrest assembly is initially retained on a vehicle wall at a determined sloped comfort angle by using only the spring clips and hangers enabling subsequent driving of a pair of threaded fasteners in their associated self-aligned apertures.

Brief Description Of The Drawings

These and other features and advantages of the invention will appear from the following written description and accompanying drawings in which:

FIG. 1 is a fragmentary vertical sectional view with parts shown in elevation and parts shown in phantom of an auxiliary foldable seat cushion assembly for a vehicle showing an improved seatback cushion attachment;

FIG. 2 is an enlarged perspective detail view of an upper attachment clip of the present invention;

FIG. 3 is an enlarged perspective detail view of a lower attachment clip of the present invention;

FIG. 4 is a detail front elevational view of the backing panel of the present invention; and FIG. 5 is a fragmentary exploded perspective view showing an initial installation step of the present invention;

Description Of The Preferred Embodiment

Figure 6:
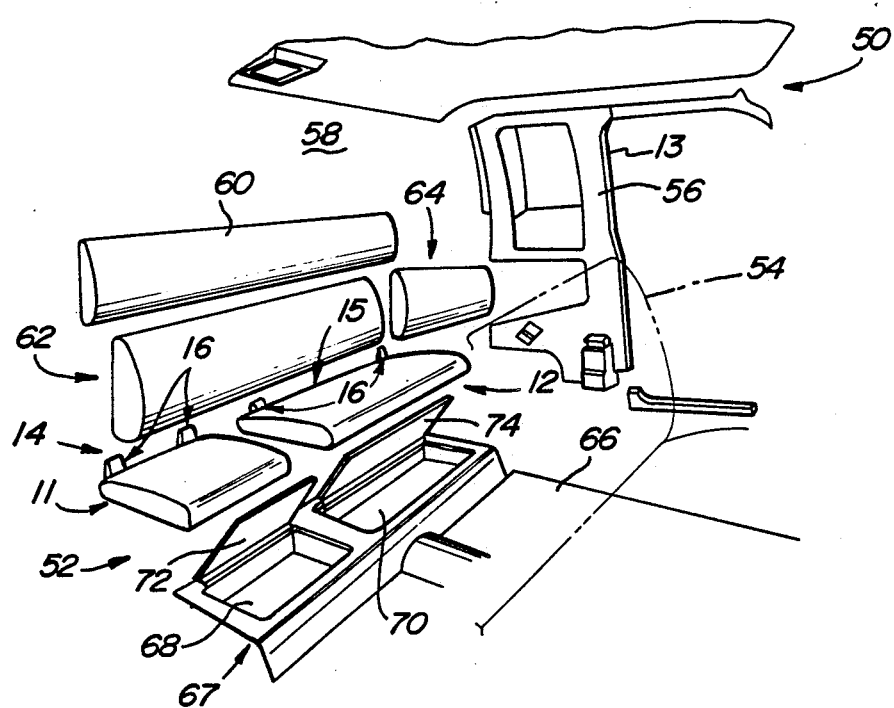
FIG. 6 is a fragmentary perspective view of a pick up truck interior showing the seat of the present invention.

Referring now to FIGS. 1 and 6 of the drawings, there is shown an auxiliary rear seat arrangement 10 for a vehicle such as a pick-up truck. The seat arrangement 10 comprises a pair of folding seat cushions 11 and 12 each having a pair of hinge assemblies 14 and 15, respectively. As the seat cushions 11 and 12 are identical except for their transverse extent only the seat cushion 12 will be described in detail. Further, as the hinge assemblies 14 and 15 are identical only the hinge assembly 15 will be described in detail.

The hinge assembly 15 of FIG. 1 includes an upper body-half bracket hinge member generally indicated at 16, and a lower seat-half bracket hinge member generally indicated at 18. As seen in FIG. 5 the body-half bracket hinge member 16 has a generally box-shaped channel configuration formed as a one-piece stamped sheet metal member. The bracket hinge member 16 includes a sloped bight wall 20 extending outwardly and downwardly from an upper horizontally disposed integral flange portion 22. The bight wall 20 is integrally formed with a pair of spaced vertically extending left and right side wall portions 24. Each side wall portion 24 terminates at its rearward end in an outwardly directed right angled mounting flange 26. Each mounting flange 26 has a bolt hole 28 adapted to receive a suitable fastener 30 (FIG. 1) for mounting to a vertical wall portion such as, for example, horizontally extending raised channel portion 32 formed in vehicle cab rear wall 34.

As seen in FIG. 1, the hinge assembly lower banana hinge member 18 is generally L-shaped and formed as a one-piece stamped sheet metal member. The hinge member 18 comprises a first leg portion 36 and a second leg portion 38 extending at substantially right angles to each other from an intermediate accurate portion 40. The one free end of the first leg is secured by means of bolts 42 to an underlying seat frame portion of the auxiliary seat cushion 12. The hinge member second leg 38 upper free end is formed with a pair of mirror image forwardly extending hinge side flanges or knuckles 44 formed with aligned pivot holes. The side flange 44 are laterally spaced for juxtaposed reception between the side wall portions 24 of its associated bracket hinge member 16. The side wall portions 24 each have a hole aligned on the horizontal hinge pivot axis of the hinge assembly for reception of hinge pin 46. Details of the hinge assembly 14 are shown in the above mentioned Draplin patent No. 4,771,507 and reference may be had to the Draplin patent for a complete description of the hinge assemblies.

In FIG. 6 a portion of the interior of a pickup truck extended cab 50 is shown defining a cargo space 52 located behind front seat 54, indicated by phantom lines. The cab 50 has side walls with only the left or driver's side wall indicated at 56. Rear wall 58 of the cab supports an upper trim bolster 60 and a lower three passenger seating backrest assembly 62, common to the pair of side-by-side seat cushions 14 and 15, together with a portion of a side wall wrap around bolster 64. The cab load floor 66 includes a raised box-like structure 67 providing a pair of cargo storage compartments 68 and 70 each having a hinged closure door 72 and 74, respectively.

Turning now to the present invention the backrest assembly 62 in FIG. 1 comprises a hardboard backing panel or base panel 64, a pad 66, and an upholstery cover 68. The base panel 64 is designed to be formed of any suitable rigid light weight material such as panel board, compressed board, or the like and has a rectangular shape as seen in FIG. 4. The pad 66 is suitably affixed as by adhesive to the forward surface of the base panel 64 and is preferably a synthetic resilient foam material. The cover 68 may be cloth, vinyl, leather, etc. and is wrapped one the pad 66 with its edges suitably secured to the base panel rearward surface in a conventional manner such as by being stapled to the base panel.

FIG. 4 shows the base panel 64 having its upper portion provided with a plurality of rectangular upper apertures 70 located in a predetermined horizontally spaced manner. As seen in FIG. 1 each of the apertures 70 are adapted to receive an upper attachment hanger generally indicated at 72. FIG. 2 shows each upper hanger comprises a plate-like body portion 74 formed with an elongated horizontally disposed slot 75. The body portion 74 is adapted for flush overlying contact with the cab rear wall 58. The lower end of the hanger 72 is formed to a U-shape defining offset aft wall section 76 and forward wall section 80. The offset aft wall section is joined to body portion by a forwardly and downwardly canted sloped section 82 while the forward wall section terminates in an outwardly beveled leading lip 84.

The U-shaped lower end of the hanger 72 is adapted to move endwise through its associated upper aperture 70 and onto the portion of the base panel 64 above the aperture. It will be noted in FIG. 4 that each aperture 70 has an upper locating hole 86 symmetrically disposed thereabove adapted to receive a tongue member 88 struck rearward from the hanger forward wall section 80. Thus, upon each hanger 72 being pre-attached in its associated panel aperture its tongue member 88 is received in its respective upper locating and retaining hole 86 to precisely position the hangers 72 in a predetermined manner. Each upper hanger 72 has the upper end of its body 74 formed with an upstanding finger 90 having a rearwardly extending tab 92 bent from its free end for a purpose to be explained.

With reference to FIG. 4 it will be seen that lower edge 94 of the base panel 64 is formed with a plurality of horizontally spaced notches 96. Each of the notches is of a predetermined size to receive an associated lower spring clip generally indicated at 98 in FIG. 3. The spring clips are constructed of spring steel having a U-shaped bend defining a forward body portion 100 and a return bent aft central tongue portion 102 together with bifurcated leg portions 104. The body portion 100 and the tongue portion 102 are spaced apart corresponding to the thickness of the backing panel 64.

The pair of aft leg portions 104 are formed by a central rectangular cutout 106 providing the leg portions 104 with the required flexibility for gripping the combined panel 64 and flush bight wall 20 as seen in FIG. 1. The leg portions 104 are normally sloped toward the body portion 100 and are integrally joined by a cross tie strap portion 108. The tie strap portion is biased into spring contact with the inner or aft surface of the clip body portion 100 to insure full engagement therewith. It will be noted in FIG. 3 that the spring clip forward body portion 100 is formed with a pair of rearwardly extending prongs 110. Each pair of hanger prongs 110 adapted to engage an associated pair of locating and retaining holes 112 symmetrically disposed above each notch 96 in the base panel 64, as seen in FIG. 4 upon the clips being pre-attached to the panel.

It will be seen in FIG. 4 that the notches 96 are adapted to be aligned with the upper-half hinge brackets 16 mounted on the cab rear wall 58. While a total of four hinge brackets 16 are required to support the pair of side-by-side seat cushions 11 and 12 only three notches 96 are provided in the panel. With reference to FIG. 6 as the inboard hinge bracket 16 of each of the seat cushions 11 and 12 are closely adjacent it was determined that one intermediate notch 96 and associated spring clip 98 were required for attachment to a corresponding inboard hinge bracket 16 to secure the common backrest 62. It will be appreciated, however, that for a single seat cushion and backrest installations each single backing panel would require a pair of notches 96 and associated spring clips 98. It will be noted that the base panel 64 has its four upper hangers 72 and its three lower spring clips 98 pre-attached prior to the bonding of the pad 66 to the panel forward surface. It will be further be appreciated the notches 96 are preferably stamped in a die in a precise manner enabling the spring clips 98 to be accurately located by hand without additional fixtures.

In operation, the installer initially mounts the three lower spring clips 98 on their associated hinge upper half member bight wall 20 as seen in FIG. 5. Next, the installer insures that each of the hanger tabs 92 is received in an associated existing temporary installation and alignment aperture 114 provided in cab rear wall 58, as seen in FIG. 1. That is, the backrest assembly 62 is temporarily retained in a self-supporting manner by the spring clips 98 and the hanger tabs 92. It will thus be appreciated that each hanger body portion elongated slot 75 is now self-aligned with an associated rear wall installation hole 116 spaced a predetermined vertical distance below a respective alignment aperture 114 by means of its tab 92 being initially located in its alignment aperture 114. This enables the installer to readily drive home a single mounting threaded fastener such as screw 118 in each of the hangers slots 75 and aligned hole 72 to anchor the backrest assembly 62 on the cab rear wall 58. Thus, in the case of the dual backrest assembly 62, only three screws 118 need be driven by the installer to secure the backrest.

With reference to FIGS. 1 and 2, it will be seen that the hanger forwardly and downwardly canted sloped section 82 defines a predetermined obtuse angle denoted at "X". It will be noted in FIG. 1 that the angle "X" is substantially 105 degrees such that it matches or conforms with the comfort angle "Y" of the sloped bight wall 20 of the upper body-half bracket hinge member 16. Thus, the hangers 72 and the body-half bracket hinge member bight walls 20 cooperate to support the backrest assembly 62 at the desired predetermined comfort angle "Z" of about 15 degrees from the vertical.

Although a preferred embodiment of the invention has been illustrated and described in detail, it will be understood that various changes and modifications may be made in the disclosed embodiment without departing from the scope and spirit of the invention as defined in the appended claims.

What is claimed is:

1. In a seat structure for a vehicle comprising a pair of laterally spaced apart inboard and outboard hinge assemblies for pivotally mounting an auxiliary seat cushion on a vehicle body vertically disposed wall, said hinge assemblies comprising a pair of horizontally spaced upper body-half bracket hinge members, each said body-half hinge member in the form of a vertically extending box-shaped channel having a bight wall interconnecting a pair of side wall portions, said bight wall sloped outwardly and downwardly at a predetermined acute comfort angle with the vertical, each said sloped bight wall adapted to support a portion of a backrest assembly base panel in a flush manner thereon, means for attaching said backrest assembly to said vehicle wall comprising in combination:

said backrest assembly base panel formed with a plurality of apertures located in a predetermined horizontally spaced manner spaced a predetermined distance from its upper edge;

a plurality of horizontally spaced lower spring steel clips, each said clip having a U-shaped bend positioned on the lower edge of said base panel, each said clip including a body portion in flush contact with the forward face of said base panel and having a plurality of downwardly and rearwardly inclined locking prongs, each said locking prong engaged in an associated clip locating hole in said base panel, each said clip having a return bent aft central tongue straddled by a pair of resilient leg portions, said body portion and central tongue spaced apart corresponding to the thickness of said base panel with said central tongue engaging the aft face of said base panel, said leg portions normally sloped toward said clip body portion with a predetermined flexibility, said clip being initially mountable onto said base panel for subsequent gripping of the combined base panel and hinge flush bight wall;

a plurality of horizontally spaced upper spring steel hangers, each said hanger comprising a plate-like strap portion with its lower end formed to a U-shape defining parallel aft and forward wall sections mounted into an associated base panel rectangular aperture, an upper locating hole positioned a predetermined distance above each said rectangular aperture;

each said hanger forward wall having a downwardly and rearwardly inclined tongue member engaged in its associated upper locating hole, said aft wall section offset forwardly from said strap portion by a forwardly and downwardly sloped section, each said hanger strap portion having its upper end formed with a rearwardly extending tab received in an associated upper opening in the vehicle wall; and said vehicle wall formed with a lower hole vertically aligned with an associated upper opening and disposed a predetermined distance therebelow, each said strap portion formed with a horizontal slot positioned in a self-aligning manner with an associated vehicle wall lower hole enabling a threaded fastener to pass through each said hanger aligned slot and associated vehicle wall lower hole fixedly securing each said hanger to the vehicle wall.

2. The backrest assembly as set forth in claim 1, wherein said base panel lower edge formed with a plurality of horizontally spaced notches of predetermined location and size adapted to receive an associated clip therein in a prepositioned manner.

3. The backrest assembly as set forth in claim 1, wherein each said hanger sloped section defining a predetermined obtuse angle with its associated aft wall section substantially matching the obtuse angle of each said upper body-half hinge member sloped bight portion as to support said backrest body panel at the predetermined acute comfort angle of the order of 15 degrees from the vertical.

* * * * *